United States Patent [19]

McPhee et al.

[11] Patent Number: 5,597,191
[45] Date of Patent: Jan. 28, 1997

[54] AUTO RELEASE CHOKER

[75] Inventors: J. Brent McPhee, Senneville; James M. Ewart, North Vancouver, both of Canada

[73] Assignee: Forest Engineering Research Institute of Canada, Pointe Claire, Canada

[21] Appl. No.: 202,573

[22] Filed: Feb. 28, 1994

[30] Foreign Application Priority Data

Sep. 21, 1993 [GB] United Kingdom ............... 9319472

[51] Int. Cl.⁶ .................................................. B66C 1/14
[52] U.S. Cl. ................................. 294/82.14; 294/82.24; 294/74
[58] Field of Search ................ 294/82.14, 82.24, 294/74, 75; 403/353; 24/115 F, 129 R, 130, 697.1, 697.2

[56] References Cited

U.S. PATENT DOCUMENTS

| | | | |
|---|---|---|---|
| 1,720,069 | 7/1929 | Yeaton | 294/74 |
| 2,872,716 | 2/1959 | Ehmann et al. | 294/74 |
| 3,239,900 | 3/1966 | Bottoms | 294/74 |
| 3,323,185 | 6/1967 | Maras | 294/82.14 |
| 3,409,950 | 11/1968 | Boyd | 294/74 |
| 3,633,960 | 1/1972 | Drayton . | |
| 4,709,952 | 12/1987 | Selby . | |
| 4,762,356 | 8/1988 | Robins | 294/82.14 |
| 5,064,235 | 11/1991 | Lessard . | |

FOREIGN PATENT DOCUMENTS

| | | |
|---|---|---|
| 124421 | 12/1909 | Canada . |
| 389394 | 6/1940 | Canada . |
| 510282 | 2/1955 | Canada . |
| 1018111 | 9/1977 | Canada . |
| 1225416 | 8/1987 | Canada . |
| 1241361 | 8/1988 | Canada . |
| 1247675 | 12/1988 | Canada . |

OTHER PUBLICATIONS

Article entitled "Yarding made easy", by Scott Jamieson, published in the Jul./Aug. 1993 issue of *Canadian Forest Industries*.

Article entitled "Spreading The Word", by Scott Jamieson, published in the Jul./Aug. 1993 issue of *Canadian Forest Industries*.

Article entitled "Risley Slingshot, Best of both worlds", by Scott Jamieson, published in the Jun. 1993 issue of *Canadian Forest Industries*.

Undated publication regarding "Chokers for automatic unhooking", pp. 215–222.

*Primary Examiner*—Dean Kramer
*Attorney, Agent, or Firm*—John Russell Uren

[57] ABSTRACT

A choker hook is connected to a choker cable and is used for pulling a log from its felled position to a desired location. The choker hook is remotely released from the log without manual intervention at the desired end position. The choker hook has a configuration where a ferrule on the end of the choker cable tends to nest within the choker hook and assume a locking position when the log is being transported. When the direction of pull in the cable is reversed, the forces will tend to remove the ferrule from its locking position and release it from the choker hook thereby releasing the log. During the force reversal, the choker hook rotates about a predetermined angle and about predetermined axes of rotation depending on its specific configuration.

6 Claims, 8 Drawing Sheets

AUTO RELEASE CHOKER

INTRODUCTION

This invention relates to log handling systems for use in forestry applications and, more particularly, to a choker hook which is released automatically and without manual intervention.

BACKGROUND OF THE INVENTION

In forestry operations, cut trees are moved from the felling area to a roadside or other desired transport location. The logs are dragged on the ground by a mainline connected to a traction machine or by a mainline overhead yarding system which carries the logs in a suspended or partially suspended manner. Steel cables extending from the mainline form a noose or choker. The choker cable is looped around one or more trees by the chokerman and is fastened back onto itself by securing a ferrule, on the end of the choker cable, in a choker hook. This allows the choker cable to tighten around the tree. Tension is then applied to the mainline to pull or lift the tree and move it from the felled position to a desired transport location.

When the tree has been moved, the choker must be released to free the tree. Prior art required that this task be accomplished manually by a chaser who slackened the choker cable and released the choker hook. The manual unhooking operation is dangerous and time consuming.

The advantages of self releasing chokers have been attractive and some such chokers are disclosed in Canadian Patent 1,225,416 (Vodors), U.S. Pat. No. 5,064,235 (Selby) and U.S. Pat. No. 5,064,235 (Lessard). These chokers, however, are complex and/or costly.

It is, therefore, an object of this invention to provide a choker hook which, when the choker hook is in a first position and the log is being transported from its felled position to its desired transport position, is of a configuration such that the pulling force on the choker cable tends to bias the ferrule of the choker cable into its locking position in the choker hook. When the direction of pull on the log and the choker cable changes, the choker hook rotates or pivots through a predetermined angle and about predetermined axes and assumes a second position where the direction of pull in the choker cable tends to remove the ferrule from its locking position.

The above object is likewise described in our U.K. provisional application Serial No. 9319472.8 filed Sep. 21, 1993, entitled AUTO RELEASE CHOKER and naming J. Brent McPhee as inventor.

SUMMARY OF THE INVENTION

According to one aspect of the invention, there is provided a choker hook movable on a cable and used to pull at least one log from a felled to a transport position, said choker hook having a first position wherein the ferrule of said cable is biased towards a locking position within said hook when the direction of pull in said cable is such that said log is moving from said felled to said transport position and a second position wherein the direction of pull in said cable is biased in a reverse direction from that in said first position and said ferrule is biased away from said locking position, said choker hook rotating through a predetermined angle and about predetermined axes during movement of said hook from said first to said second positions.

According to a further aspect of the invention there is provided a choker hook for hauling a log, said choker hook comprising a bottom surface adapted to overlie a portion of the outer surface of the log, a body, a top surface, a bore extending through said body substantially between the top and bottom surfaces for running a cable therethrough, said bore having an inlet at one end and an outlet at the opposite end, said body including a first recess extending from said top surface communicating with said outlet of said bore, said first recess being open to one side of said body, a slot extending parallel to the transverse axis of said body and downwardly from said top surface, said slot being spaced from said first recess and a socket defined in said body to releasably retain a ferrule of the cable.

According to yet a further aspect of the invention, there is provided a choker hook comprising a first generally arcuate cable passageway, a base extending from said passageway, a pocket portion defining the locking position of a ferrule fixedly mounted on a cable, said pocket portion extending from said base, a flange connected to and extending from said pocket portion and a second generally elongate cable passageway extending from the outside of said flange to said pocket portion.

According to still yet a further aspect of the invention, there is provided a choker hook comprising an arcuate cable passageway, a base extending from said arcuate cable passageway, first and second flanges extending from said arcuate cable passageway and generally being positioned at right angles, a lower edge connected to said first and second flanges and being generally transverse thereto and an elongate slot in said lower edge.

According to yet a further aspect of the invention, there is provided choker cable apparatus comprising a choker cable, a ferrule fixedly mounted on the end of said cable, a collar fixedly mounted on said cable upstream of said ferrule, a first washer movably mounted on said cable and a compression spring positioned on said cable between said first washer and said collar, said compression spring acting to exert a force on said first washer biasing said first washer against said ferrule.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENTS

For description purposes, top, bottom, front and back surfaces are herewith defined. Back towards front is parallel with the longitudinal axis of the tree or other elongate member object to be pulled, dragged or lifted when the choke hook is in operating position. The right and left sides are taken from a position where the observer is facing forwardly towards the direction of mainline pull. The bottom is the flat or contoured surface of the choker hook which is intended to be approximately flush with the surface of the felled tree or elongate member during the pulling operation.

Figure 4:
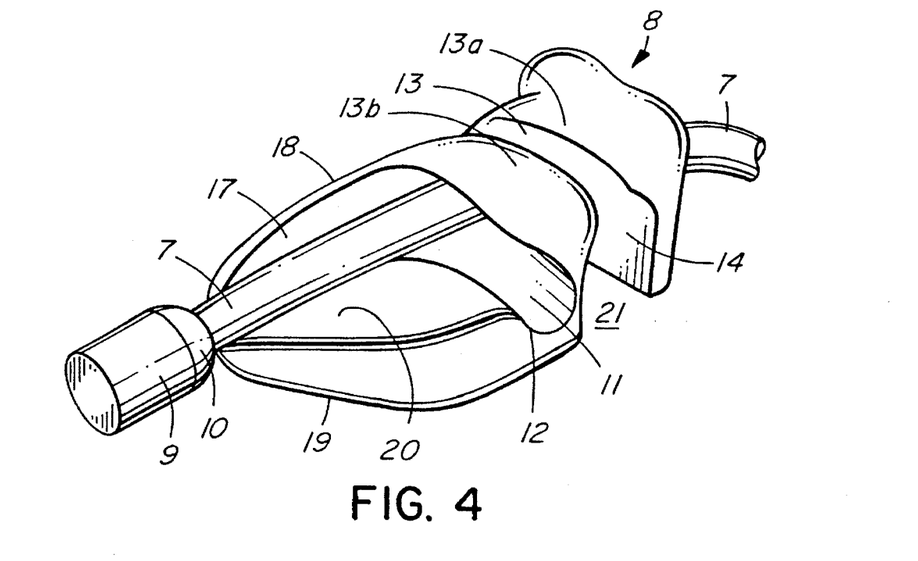
FIG. 4 is an enlarged diagrammatic isometric view of the choker hook according to a first embodiment of the invention illustrating the ferrule together with the cable to which it is affixed in a position prior to attachment to a log.
Figure 5:
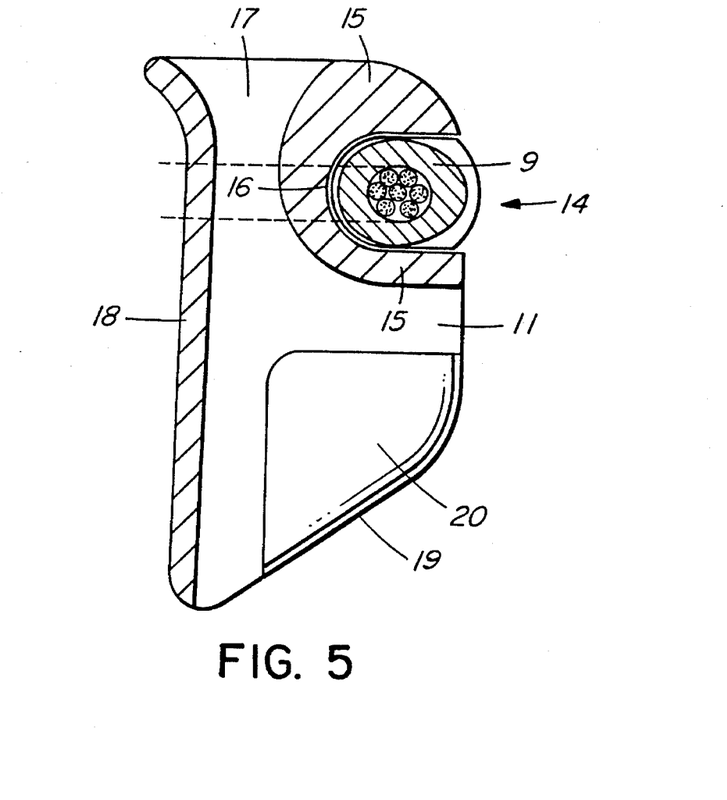
FIG. 5 is a sectional view of the choker hook according to the invention illustrating the seating recess and the ferrule seated in the socket in the operating condition.

Returning now to the drawings, the choker hook according to the invention is illustrated generally at 8 in FIG. 4 and comprises a single piece, metal casting. The casting of the choker hook 8 is generally rectangular with a length roughly twice its width and a width roughly twice its height. A cable reeveway 17 is found in the choker hook 8. The reeveway 17 is defined by the left side wall 18 of the choker hook 8 and the seating recess pocket wall 15 as seen in FIG. 5. The reeveway 17 opens at its end to the partially exposed right cable reeveway 11 when viewed in plan, which is defined by the half-wall elevated surface 20 and seating recess pocket wall 15. The partially exposed reeveway 11 opens at the right side of the choker hook 8.

A recessed notch 12 is incorporated in the opening of the right reeveway 11 in the partial wall of the elevated surface 20 as a means for the cable 7 to bear against and remain within the right reeveway 11 while the choker hook 8 is being set but not yet under tension. The surfaces that define the two reeveways 17, 11 are rounded off so as to provide flared entrances.

Figure 7:
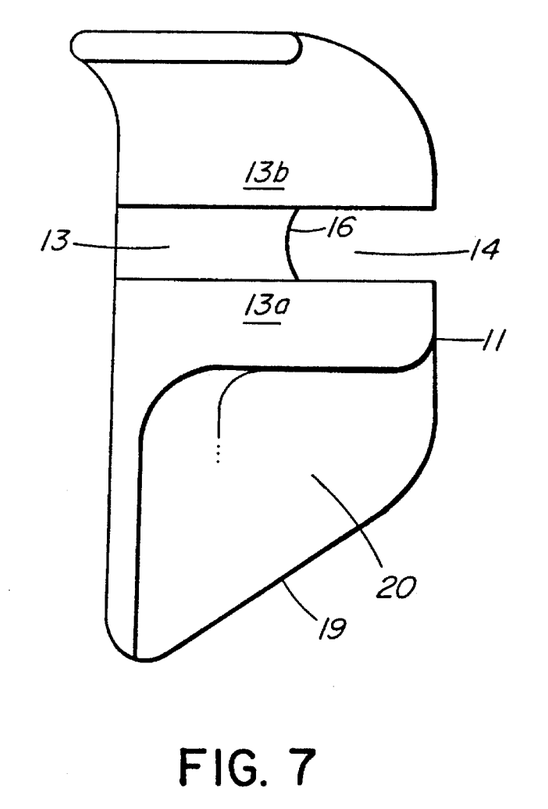
FIG. 7 is a plan view of choker hook.

A groove 13 furnishes an allowance for the choker cable 7 just ahead of the ferrule 9 as illustrated in FIGS. 4 and 7. The groove 13 serves to align the cable 7 at approximately right angles to the longitudinal axis of the choker hook 8 and about the periphery of the log as viewed in FIG. 8B.

Figure 6:
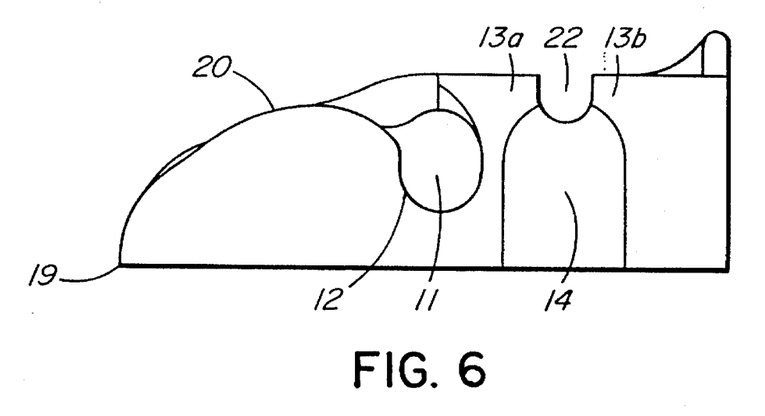
FIG. 6 is a side view of the choker hook according to the invention illustrating the ferrule seating recess, the cable notch in the right side, cable reeveway and elevated surface.

A hollowed out socket 14 is located where groove 13 ends, immediately beneath the right side of the longitudinal axis of the choker hook 8 is a hollowed out socket 14. The socket 14 serves to receive and provide seating for the ferrule 9. The end wall 16 of the socket 14 provides a rounded horizontal seat for mating with the round surface 10 on the ferrule 9. The socket 14 is open on the bottom as seen in FIG. 6. The opening 21 of the socket 14 on the right side of the choker hook 8 is of sufficient size to have the ferrule 9 of the cable 7 passed into it in an endwise direction, as seen in FIGS. 4 and 5.

A walled passage or slot 22 is a continuance of surfaces 13A and 13B. Slot 22 continues through the end wall 16 to join with the cable groove 13 (FIG. 7). Slot 22 is slightly wider than the diameter of the cable 7.

A heel 19 prevents the choker hook 8 from flipping over when the log is being pulled. In the release mode, it becomes a pivot for the reverse or release action of the hook 8 (FIGS. 8B and 8C, respectively). Because the right cable reeveway 11 and groove 13 both position the cable 7 for 90° departures and approximately parallel with bottom surface of the hook body 8, the heel 19 acts to reduce, by increasing the amount of required moment, any tendency of the choker hook 8 to flip over during the travel mode (FIG. 8B). The groove 13 is relatively close and parallel to the right cable reeveway 11. This also reduces any twisting tendency of the choker hook 8 generated by the movement created by the ferrule end of the cable 7. The ferrule 9 applied coaxial to cable 7 has a diameter that is roughly twice that of the cable 7. Ferrule 9 has a round taper 10 to facilitate pivotal action in the seating recess 14.

Operation

Figure 1:
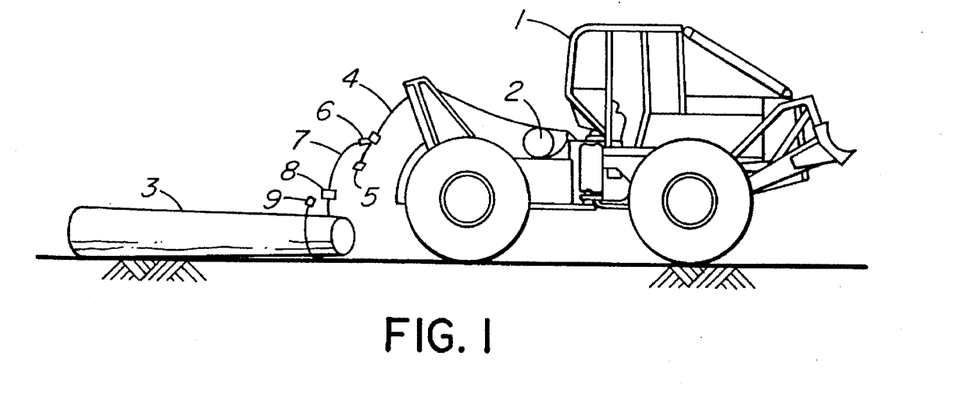
FIG. 1 is a diagrammatic elevation view of sling connected to a cable extending from the rear of a tractor, the sling being wound around a tree to be dragged or lifted to a desired location and being in a position prior to being attached at the other end to choker hook according to the present invention.
Figure 2:
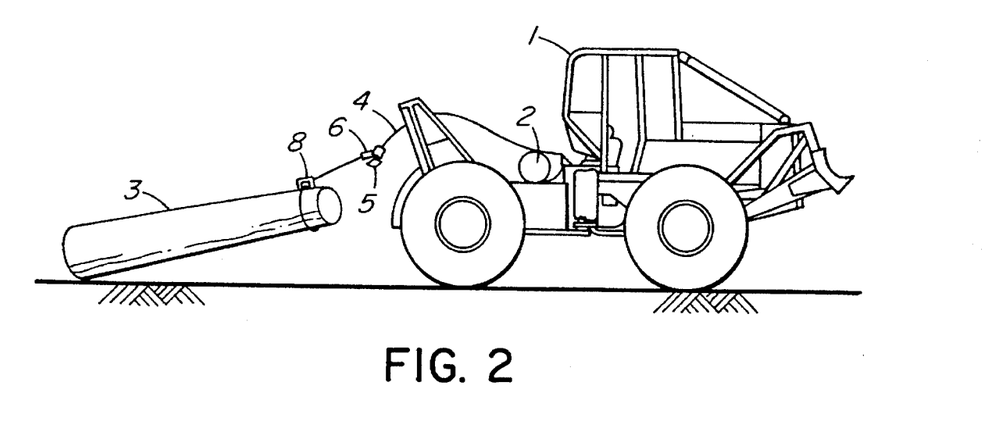
FIG. 2 is a view similar to that of FIG. 1 but with the sling being under tension and being attached to the choker hook.

In operation, the choker cable 7 slides on a mainline 4 (FIG. 1) by means of a twitch hook 6 or the like. A line ender 5 secures the choker cable 7 from sliding off the end of the mainline 4.

The end of the choker cable 7 opposite to the end adjacent the twitch hook 6 passes through the longitudinal reeveway 17 of the hook 8 and the ferrule 9 (FIG. 4) prevents the hook 8 from sliding off the choker cable in the unloaded mode.

Figure 8A:
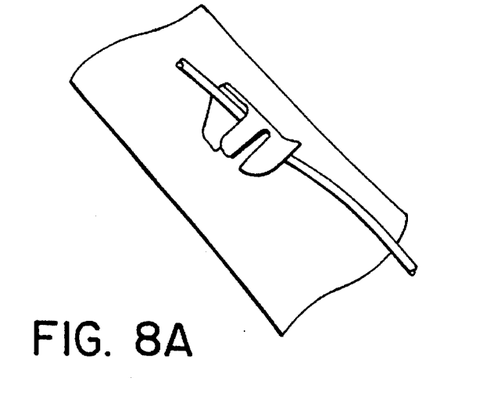
FIGS. 8A through 8D are isometric views of the choker hook of FIGS. 4–7 illustrating the operating steps taken to secure and release the ferrule in the choker hook.
Figure 8B:
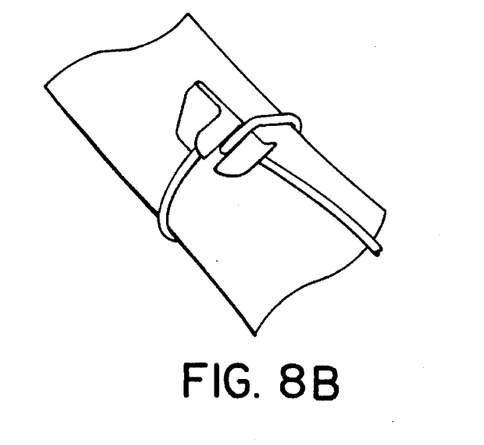
Figure 8C:
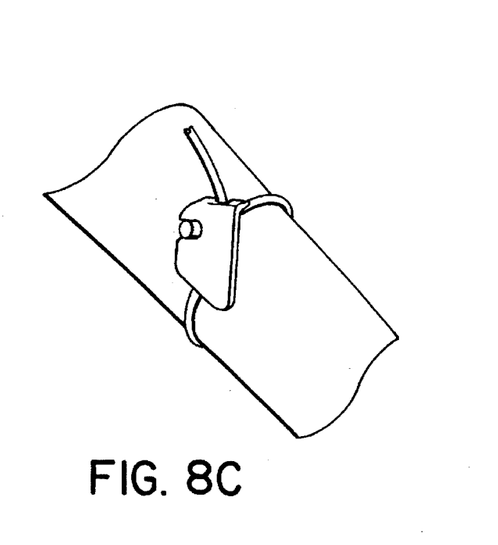

The choker hook 8 is positioned on the log such that the front of the hook 8 faces the direction of desired pull such that the heel 19 faces away from the direction of pull (FIG. 8A). The bottom of the choker hook 8 is mounted flush against the log 3.

To fasten the hook 8, the ferrule end of the choker cable 7 is passed under and around the log 3. The cable 7 is passed first from the right cable reeveway 11 down under the log 3 and then back up and over the hook body 8 where the ferrule 9 is placed in the seating recess 14 (FIG. 8B). To ensure the hook 8 remains in that position, the cable 7 is pulled snug. Due to the stiffness and springy nature of the cable 7, the recessed notch 12 serves to hold the choker hook 8 set before and during the loaded travel. At this point a complete loop has been formed.

When the main line 4 is pulled by the winch 2, for example, in dragging or lifting the log 3, the loop will be tightened about the log 3. The ferrule 9 of cable 7 will be firmly secured in place within the choker hook 8. While under tension, the loop creates downward, bilateral forces upon the choker hook 8 as explained. That portion of cable 7 that is in contact with the right cable reeveway's exit edge forces the edge of the choker hook 8 downwardly. This, in turn, counteracts the lifting tendency of the cable 7 with the ferrule 9 upon the right side of the choker hook 8 (FIG. 8B).

Figure 3:
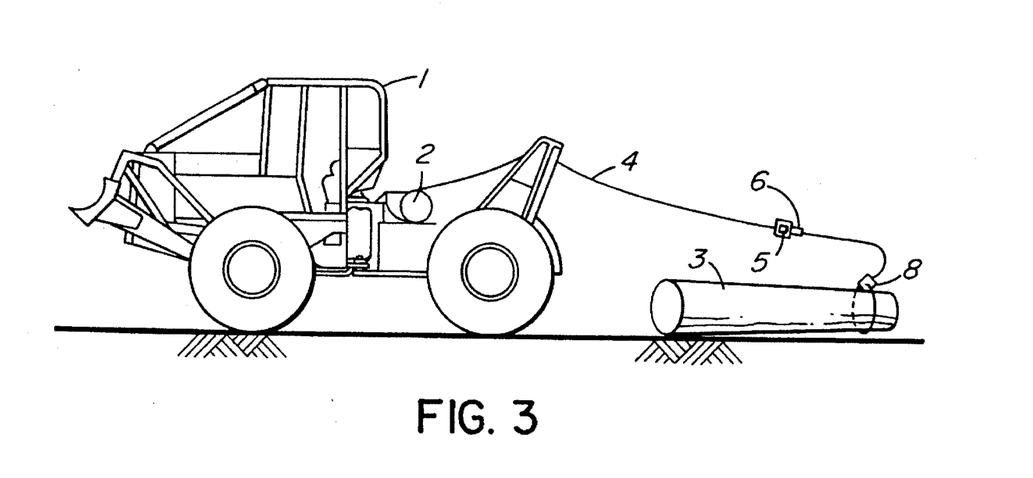
FIG. 3 is a view similar to FIGS. 1 and 2 with the tractor now facing in an opposite direction and illustrating an operating technique required to release the cable from the choker hook.
Figure 8D:
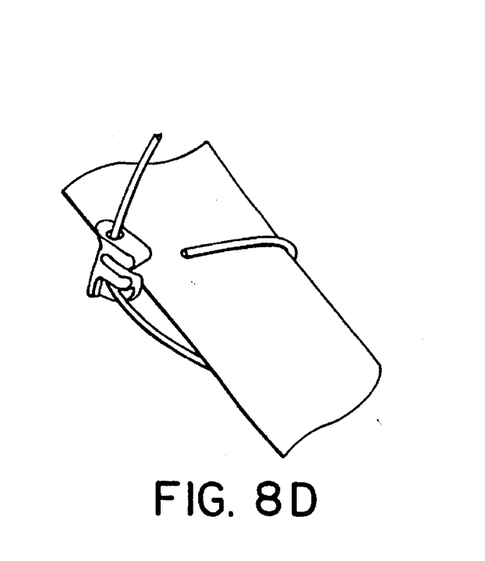

To release the choker 8, the direction of pull on the log 3 is reversed as illustrated in FIG. 3. In a cable hauling system, rather than using a tractor, the mainline 4 is pulled back by the haul-back line (not illustrated). During this time, tension on the mainline 4 is reduced and, once the line is positioned so as to redirect the choker cable tension in the opposite direction, tension is reapplied by the winch 2 on the cable 7. The hook 8 begins to pivot on the heel 19 (FIG. 8C). The cable 7 remains secure until the choker hook 8 is perpendicular to the log's surface at which point the portion of the cable within the right cable reeveway 11 being held in place by the recessed notch 12 passes up and over the raised surface 20. Forces still present on the ferrule 9 end of the cable 7 cause the choker hook 8 to twist thereby releasing the ferrule 9 as illustrated in FIG. 8D.

Thus, it will be seen that when the choker hook 8 according to the invention is moving the log 3 from the felled to the transport position, the tension in the pulling cable 7 which is pulling the log 3 also tends to lock the ferrule 9 of the cable 7 in the pocket portion or socket 14 of the choker hook 8. When, however, the direction of pull in the cable 7 has changed as will be the case when the log 3 has reached its desired position, the choker hook 8 will rotate or flip through a predetermined angle, in this case about two axes of rotation, and the tension in cable 7 will tend to withdraw the ferrule 9 from the pocket portion or socket 14.

Figures 9A, 9B:
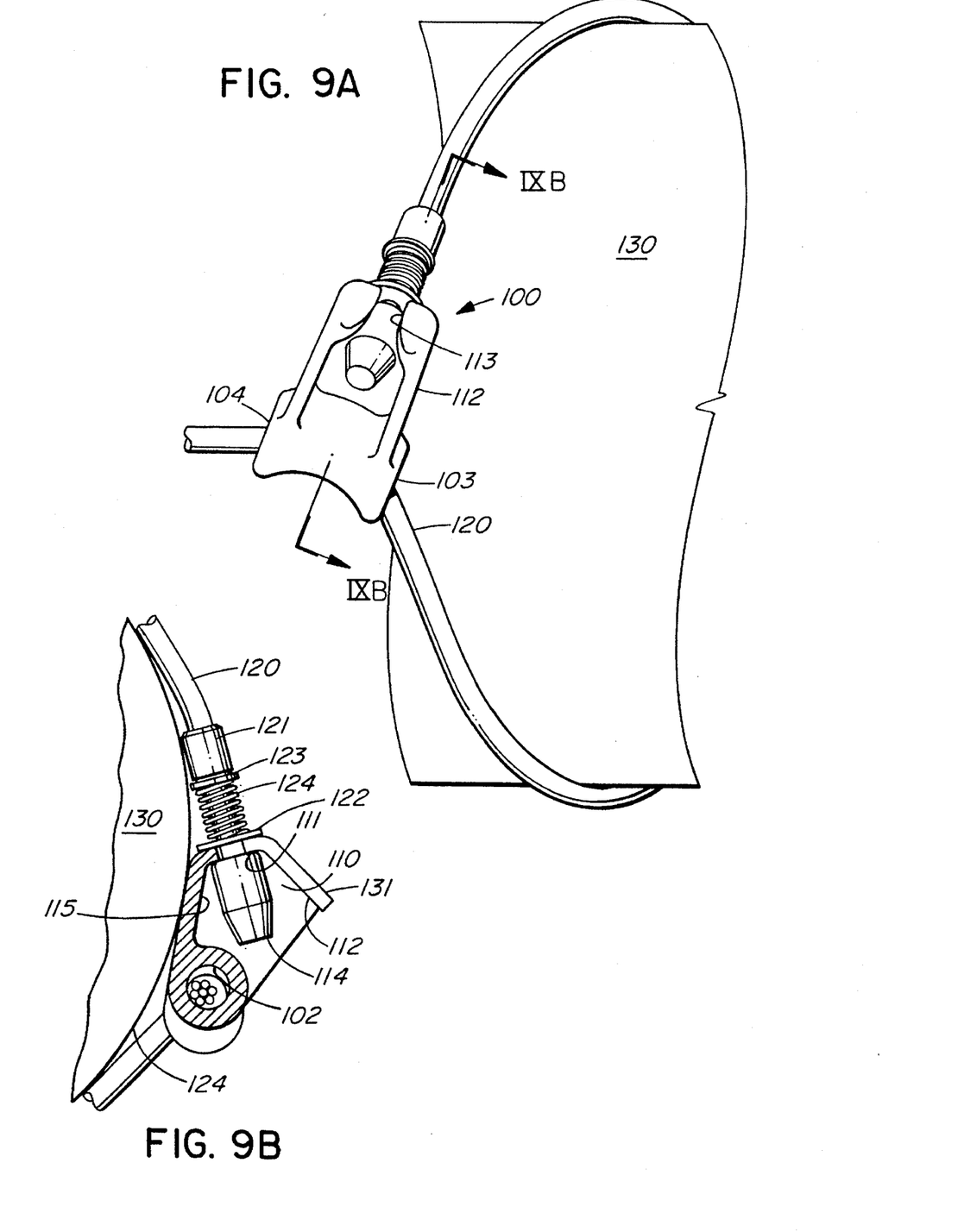
FIG. 9A is an isometric view of a choker hook in its operating position according to a further aspect of the invention.
FIG. 9B is a sectional view taken along 9B—9B of FIG. 9A particularly illustrating the seating of the ferrule in the socket of the choker hook.
Figures 10A, 10B:
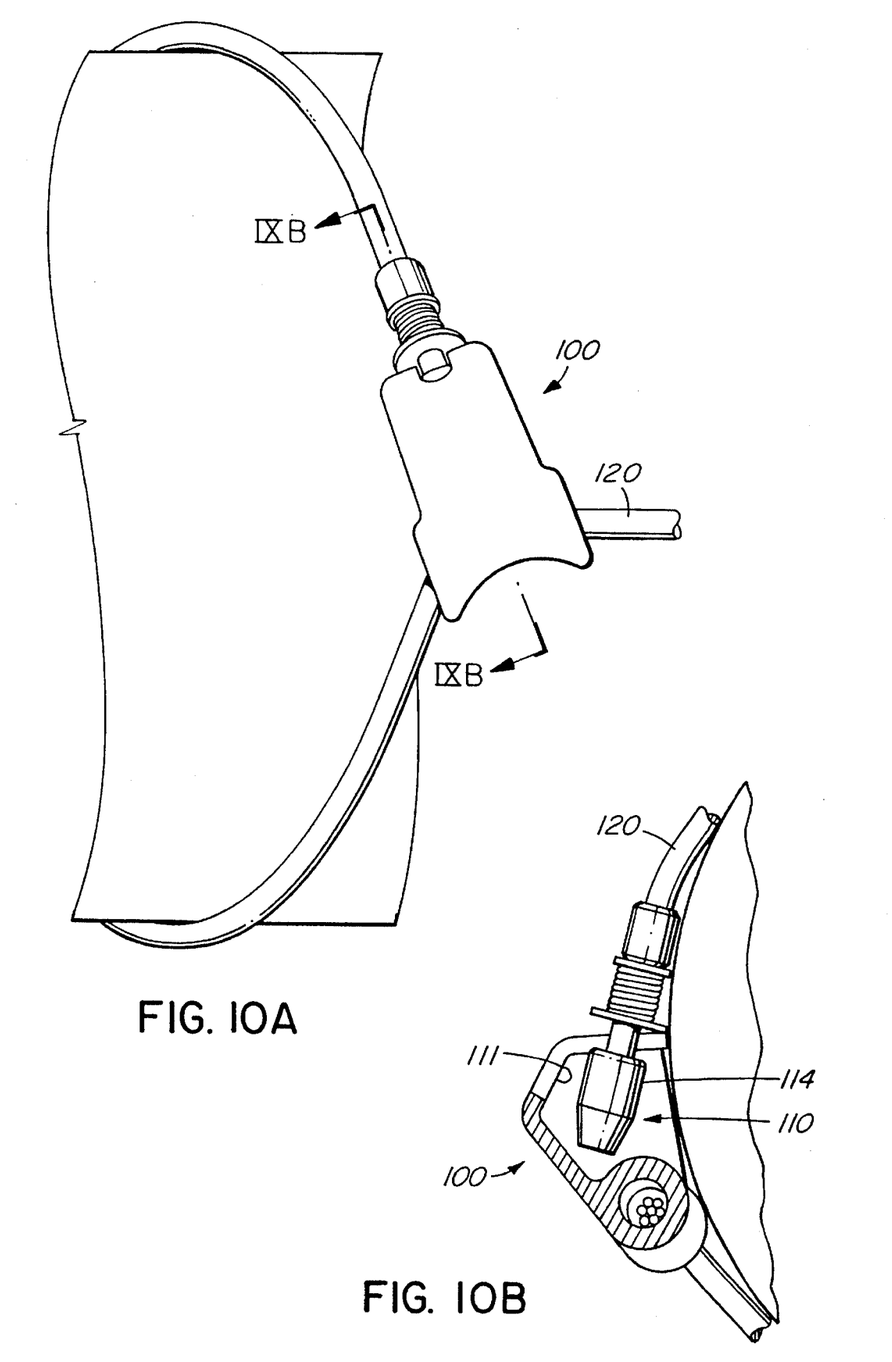
FIG. 10A is an isometric view of the choker hook of FIGS. 9A and 9B but illustrating a reverse direction of pull and the movement of the ferrule in the choker hook.
FIG. 10B is a sectional view of the choker hook of FIG. 10A taken along 10B—10B of FIG. 10A.

A further embodiment of the invention is illustrated in FIGS. 9 and 10. In this embodiment, the choker hook is generally shown at 100 and is mounted on a cable 120 which extends through an arcuate or curved passageway 102 having an inlet 103 and an outlet 104.

A ferrule or knob socket is generally illustrated at 110, as seen in FIGS. 9B and 10B. The knob socket 110 has a first or pocket portion 111 and a flange 112 leading to the pocket 111. The pocket 111 extends at an obtuse angle from the base 115 which contains the arcuate passageway 102 and the flange 112 extends at an obtuse angle to the pocket 111.

A longitudinal passageway 113 (FIG. 9A) is formed in the flange 112 to allow access of a ferrule 114 mounted to the end of a cable 120 to the pocket portion 111 of the choker 100. The longitudinal passageway 113 has an opening which gradually reduces in width as the ferrule moves from the outside of the choker 100 into the pocket 111 on cable 120.

Cable 120 has a collar 121 also mounted in a fixed position on the cable 120. A washer 122 is located between ferrule 114 and collar 121 so as to move on cable 120 relative to ferrule 114. Conveniently, a second washer 123 may be positioned adjacent the ferrule 121 and a compression spring 124 is positioned between washers 122, 123 to provide a force tending to maintain washer 122 against the base of ferrule 114.

In operation, the base 115 of the choker hook 100 is positioned so as to contact the outer surface 124 of log 130 as seen in FIG. 9B. Cable 120 is manually wrapped around log 130 by the chokerman as more clearly seen in FIG. 9A and the washer 122 is brought into contact with the upper surface 131 of flange 112. The chokerman will exert a force on washer 122 by flange 112 and thereby separate washer 122 from the ferrule 114. The chokerman will then apply an inwardly directed force on cable 120. The cable 120 will slide through longitudinal passageway 113 until the ferrule 114 is securely seated in pocket 111. Tension will then be applied on cable 120 as indicated in FIG. 9A and the log 130 will be moved to its desired position with ferrule 114 within a pocket 111.

The direction of pull is then reversed by the operator of the tractor or the cable haulback line (not shown), as the case may be, and the choker hook 100 will move through a predetermined angle, in this case approximately 90°, with the flange 112 initially contacting the log 130. The choker 100 will assume the position as seen in FIG. 10B and there will be a force on the cable 120 which tends to move the cable 120 out of passageway 113. Such tension is enough to overcome the force between washer 122, pocket 111 and ferrule 114 and ferrule 114 will follow the cable 120 out of the pocket 111 by the continuing tension on the choker 100 by cable 120 in a reverse direction. Thus, the ferrule 114 will slide out of the longitudinal passageway 113 and the choker hook 100 will fall free from engagement with the ferrule 114 and cable 120 without being manually manipulated at the choker hook 100 by the chaser.

Figure 11A:
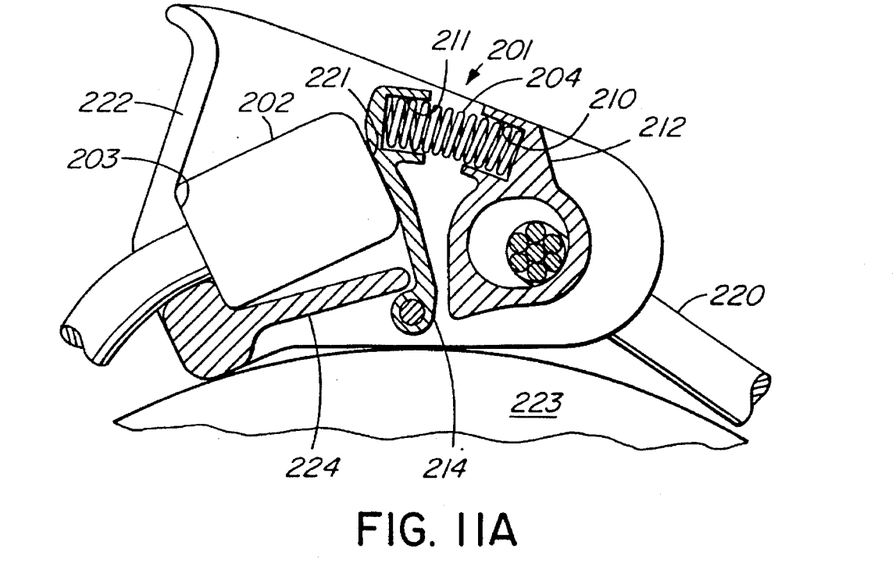
FIG. 11A is a sectional view of a further embodiment of the choker hook similar to the hook of FIGS. 10A and 10B but illustrating internal ferrule keeping apparatus with the ferrule in its operating position with the log being pulled.
Figure 11B:
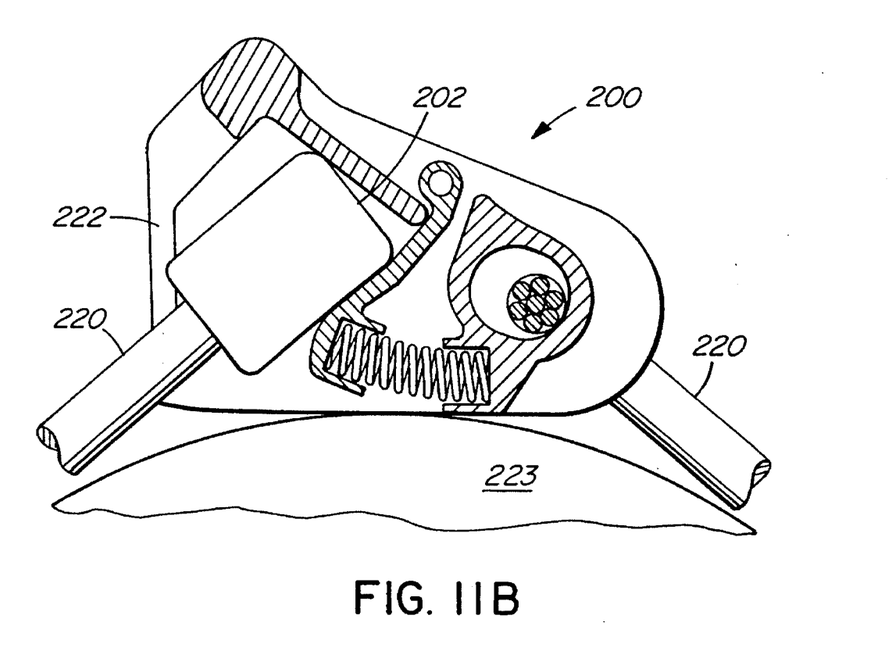
FIG. 11B is a sectional view similar to FIG. 11A but illustrating the release action of the ferrule from the choker hook.

A further embodiment of the invention is illustrated in FIGS. 11a and 11b. This embodiment, which illustrates a choker hook 200, takes the same form as choker 100 illustrated in FIGS. 9 and 10 but, rather than utilize the compression spring 124, washers 123, 122 and collar 121 of the FIG. 9 embodiment, a spring mounted ferrule restraint mechanism generally illustrated at 201 is used which maintains the ferrule 202 in the pocket 203 of the choker 200 when the choker is used in the in-haul position illustrated in FIG. 11A.

The restraint mechanism 201 includes a compression spring 204 which is mounted in complementary recesses 210, 211 in the base 212 and movable arm 213, respectively. Arm 213 is hinged about pivot axis 214, pivot axis 214 extending from opposite sides of the flange (not shown). The flange has a configuration quite similar to flange 112 of choker 100 in the FIG. 9 and 10 embodiment.

In operation, the chokerman will orient the choker 200 on the outer surface of a log similar to the technique used with the FIG. 9 and 10 embodiments and the ferrule 202 will be placed generally with the base end 221 of ferrule 202 against movable arm 213 or fixed flange 224. The cable 220 will be pulled through longitudinal passageway 222 against the force created by compression spring 204 on movable arm 213 and the ferrule 202 will reorient itself following cable 220 until the ferrule 202 is held securely in position in pocket 203 of choker hook 200 as seen in FIG. 11A. The log 223 will be hauled to its desired location.

When the log 223 has reached its desired location, the direction of pull in the cable 220 is reversed and the choker hook 200 will again rotate through the predetermined angle of approximately 90° such that choker hook 200 assumes a position as illustrated in FIG. 11B. Cable 220 will tend to slide out of longitudinal passageway 222 and ferrule 202 will rotate in the counter-clockwise direction indicated in FIG. 11B until cable 220 is free of the longitudinal passageway 222 whereupon the ferrule 202 and cable 220 are free to escape from the interior of choker hook 200. Thus, and again, the choker hook 200 is disconnected from the ferrule 202 and cable 220 without manual intervention by the chaser or other operator.

Figure 12A:
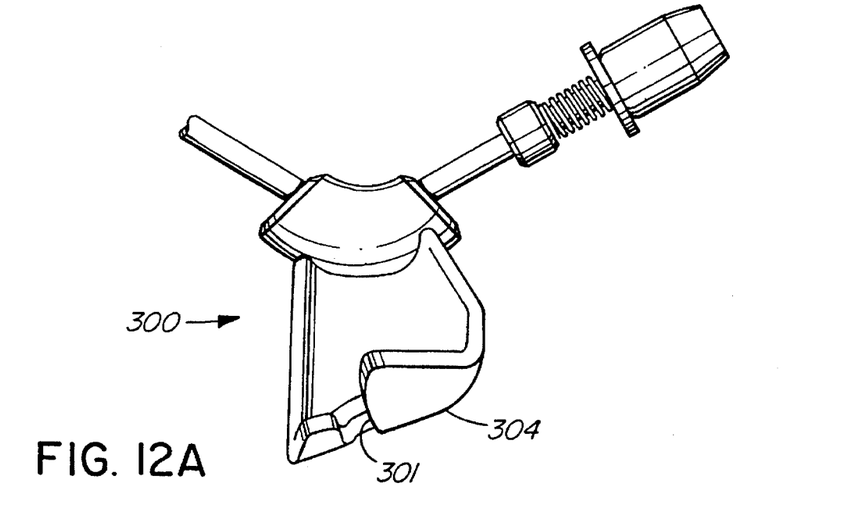
FIG. 12A is a side view of yet a further embodiment of a choker hook according to the invention.
Figure 12B:
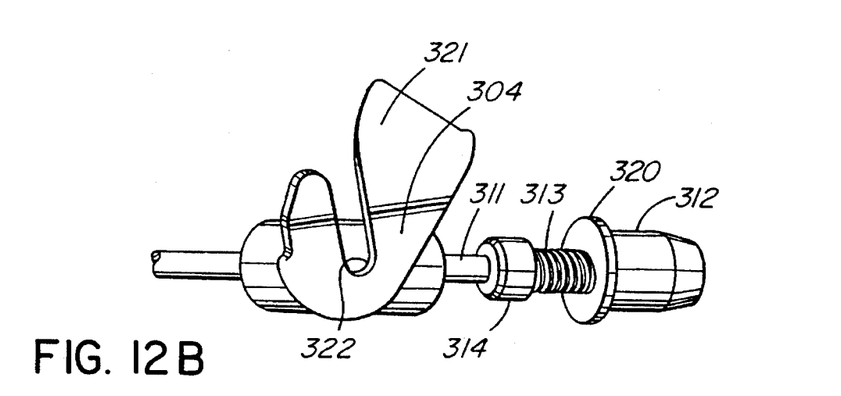
FIG. 12B is a side view of the choker hook of FIG. 12A further illustrating the cable and its attached ferrule extending through the choker hook prior to being encircled about a felled log.
Figure 12C:
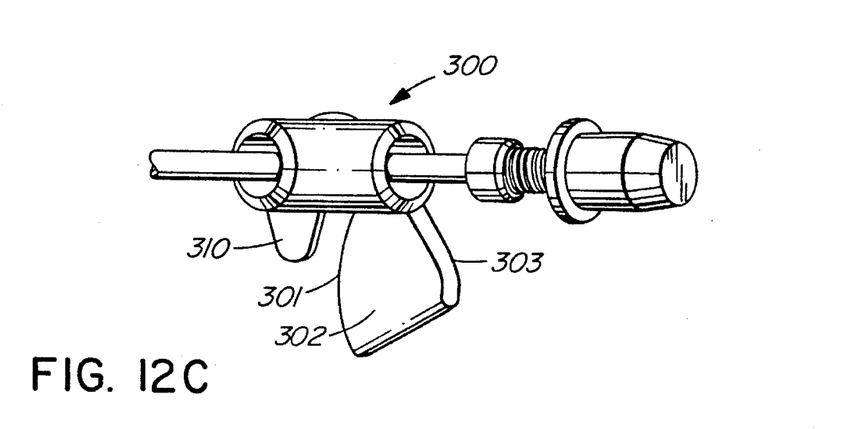
FIG. 12C is a side view taken from the opposite side of the choker hook of FIG. 12A.

Yet a further embodiment of the choker hook according to the invention is illustrated in FIG. 12A, 12B and 12C. In this embodiment, the choker 300 has an elongate slot 301 extending from the outside and a flange 302 in which the elongate slot 301 is formed. Flange 302 has a first arm 303 extending substantially perpendicular from the base 304. Flange 302 further includes a second arm 310 likewise extending from the base 304. Slot 301 is defined by the inner surfaces of flanges 302, 310.

In operation, a cable 311 having a ferrule 312 likewise has a compression spring 313 mounted between a fixed collar 314 and washer 320 which is movable on cable 311 and is intended to contact the base of ferrule 312 when out of the pocket of the choker hook 300.

The choker 300 will be mounted so that the base 304 of the arcuate passageway is adjacent the outer surface of the log which it is intended to pull. The cable 311 will be wrapped around the log and the washer 320 will be brought into contact with the lower edge 321 of flange 302. The chokerman will direct an inwardly directed force on cable 311 thereby forcing ferrule 312 to become separated from washer 320 and forcing the ferrule 312 firmly into the pocket found within the choker 300. Tension will then be applied to cable 311 and the ferrule 312 will be held securely in the pocket adjacent the end 322 of elongate slot 301 while the log is being pulled.

When the log reaches its desired location and the direction of pull on the cable is reversed, the choker 300 will rotate about a predetermined angle and pivot axes and the elongate slot 301 will be directed towards the pulling tension now exerted on cable 311. The force will tend to withdraw the ferrule 312 from the pocket of the choker 321 through elongate slot 301. As the tension increases, the choker 300 and ferrule 312 will separate without manual intervention by the chaser.

In addition to the compression spring 204 mounted in the choker hook 100 as shown in the FIG. 9 and 10 embodiment, it is contemplated that many different configurations could be used to fulfil the same function. For example, a movable arm could be used similar to the arm 213 in FIG. 11A but a torsion spring would be fitted about the axis of rotation of the arm 213 and would provide the necessary force to retain the ferrule 202 in the pocket portion 203. Likewise, a spring loaded plunger could also be used to maintain the ferrule 202 in the pocket portion 203.

While specific embodiments of the invention have been described, such embodiments are to be taken as illustrative of the invention only and not as limiting its scope which should be defined in accordance with the accompanying claims.

We claim:

1. A choker hook movable on a cable having a ferrule and used to pull at least one log from a felled to a transport position, said choker hook having a first position wherein said cable extends through an arcuate passageway, and said ferrule of said cable is biased into a locking position within said hook when the direction of pull in said cable is such that said log is moving from said felled to said transport position and a second position wherein the direction of pull in said cable is biased in a reverse direction from that in said first position and said ferrule is biased and moves away from said locking possition, said choker hook rotating through a predetermined angle and about predetermined axes during movement of said hook from said first to said second positions, said arcuate passageway remaining stationary relative to said locking position of said ferrule within said hook during rotation of said hook from said first to said second positions.

2. A choker hook as in claim 1 wherein said predetermined angle is approximately equal to or greater than 90° and less than or equal to 180°.

3. A choker hook as in claim 1 wherein the cable is movable through an arcuate cable passageway and further comprising a base extending from said arcuate cable passageway, first and second flanges extending from said arcuate cable passageway, and generally being positioned at right angles, a lower edge connected to said first and second flanges being generally transverse thereto and an elongate slot in said lower edge.

4. A choker hook as in claim 3 wherein said first and second flanges and said lower edge define a pocket portion for retaining the ferrule of the cable, said pocket portion being located generally at the intersection of said first and second flanges.

5. A choker hook as in claim 4 wherein said elongate slot is defined by two arms together forming the lower edge.

6. A choker hook as in claim 5 wherein one of said two arms extends outwardly from and is connected to said first flange and the other of said two arms extends outwardly from and is connected to said second flange.

* * * * *